United States Patent [19]

Hathcock, Jr.

[11] 3,737,056
[45] June 5, 1973

[54] PLURAL NUMBER CONTROL SYSTEM FOR AN AUTOMATIC WAREHOUSE

[75] Inventor: James S. Hathcock, Jr., Mendota, Ill.

[73] Assignee: Conco Inc., Mendota, Ill.

[22] Filed: Apr. 19, 1971

[21] Appl. No.: 135,397

Related U.S. Application Data

[63] Continuation of Ser. No. 810,494, March 26, 1969, abandoned.

[52] U.S. Cl. .................. 214/16.4 A, 318/320.1
[51] Int. Cl. ................................ B65g 1/06
[58] Field of Search .................. 214/16.4 A

[56] References Cited

UNITED STATES PATENTS

| | | | |
|---|---|---|---|
| 2,988,237 | 6/1961 | Devol | 214/11 R |
| 3,105,927 | 10/1963 | Flatten et al. | 318/20.310 X |
| 3,399,753 | 9/1968 | Revelle | 318/20.315 X |
| 3,402,836 | 9/1968 | Debrey et al. | 214/16.4 A |
| 3,490,616 | 1/1970 | Castaldi | 214/16.4 A |
| 3,486,640 | 12/1969 | Lemelson | 214/16.4 A |
| 3,504,245 | 3/1970 | Cotton et al. | 214/16.4 X |

Primary Examiner—Gerald M. Forlenza
Assistant Examiner—Raymond B. Johnson
Attorney—Hofgren, Wegner, Allen, Stellman & McCord

[57] ABSTRACT

Each bin in a warehouse is uniquely identified by a binary coded decimal number which locates its position with relation to the remaining bins. A control circuit stores the address of a selected bin and moves a stacker crane in a forward or reverse direction toward the selected bin by subtracting a sensed address at which the stacker crane is located from the stored address identifying the selected bin. As the absolute value of the subtracted difference approaches zero, the stacker crane speed is slowed, and finally stopped when the subtractor reaches zero. The sensed address also controls fine positioning of the crane and various gating for the control circuit.

5 Claims, 7 Drawing Figures

PLURAL NUMBER CONTROL SYSTEM FOR AN AUTOMATIC WAREHOUSE

This application is a continuation of U.S. Pat. application Ser. No. 810,494 filed Mar. 26, 1969 which is now abandoned.

This invention relates to an automatic warehousing system, and more particularly to a control for a warehousing system utilizable with a storage rack having a plurality of storage bins, the location of each bin being identified and detected by means of unique indicia individually related to each bin.

The present control system is of the type in which each individual bin in a warehouse is uniquely identified, and more particularly is an improvement on the control system shown in U.S. Pat. No. 3,402,836, issued Sept. 24, 1968 to R.J. Debrey, et al., and assigned to the assignee of the present application. In the Debrey control system, a comparison is made between a sensed binary address at which a stacker crane is located and a binary address identifying a selected bin.

The Debrey bin identifying addresses are located at the beginning of each bin, and thereby indicate that the stacker crane must be slowed and stopped somewhere after a desired address is sensed and before the occurrence of the next address. To accomplish this, the speed of the stacker crane is reduced from fast to slow when a match is found by a comparator. Fine positioning within the zone of a bin is effected by means of a protruding abutment which is mechanically sensed to brake the stacker crane and thereby fine position the crane directly in position for depositing or retrieving a load.

When the Debrey control system operates in a reverse direction of travel, a translator is used to convert the stored address into a new address for identifying the selected bin which now will be approached from the rear. Upon the occurrence of a match, another slowdown and fine positioning operation is initiated, similar to the forward direction of travel. Such a control system provides numerous advantages over prior counting type control systems.

The applicant's control system disclosed herein provides a simplification of the control circuit, such as used in Debrey, which are necessary for operating an automatic warehousing system using uniquely identified bins, and provides improved operation, while retaining all of the advantages of this type of automatic warehousing apparatus as compared with prior counting and other types of automatic warehousing apparatus. The uniquely identified bins are identified by unique sets of coded indicia representative of the middle position of the bin, and more particularly the position at which the stacker crane should stop for load deposit or retrieval. The control system includes means for subtracting the unique sets of indicia which are read by a sensor from a stored unique set of indicia, to control direction of travel and the speed and stopping operations of a stacker crane or other article conveyor. When a subtracted difference of zero is found, the article conveyor is abruptly stopped at its instant location, which corresponds to the middle position of the selected bin.

The present control system eliminates the need for a fine positioning sensor which is independent of the indicia being sensed, and allows the fine position and bin indicating indicia to be combined. The necessity for a translator operative in only one direction of travel is also eliminated by using subtractor and detector units which are effective in both directions of travel. The subtractor and detector units also are more adaptable for providing a plurality of output signals which can control one or more stages of speed slowdown prior to reaching a desired bin position. Other advantages will become apparent from the following description.

One object of this invention is to provide an automatic warehousing system using a subtractor for controlling the operation of an article conveyor in response to a subtracted difference between coded indicia representing a desired bin location and a present bin location.

Another object of this invention is to provide an automatic warehousing system wherein coded indicia used to identify bin locations are read by sensing means located on an article conveyor and are used to both control the speed of operation and stopping of the article conveyor and to control the fine positioning of the article conveyor for load deposit and retrieval.

One feature of the present invention is an automatic warehousing apparatus with uniquely identified bins and a subtractor unit for providing a plurality of absolute value signals which indicate the distance the article conveyor is located in either direction from a desired bin.

Another feature of the invention is the provision of an automatic warehousing system using a control unit which subtracts desired and present bin positions as identified by binary numbers. The unit includes difference and borrow elements for each subtracted bit position forming the binary numbers. The borrow elements control the direction of travel of the article conveyor. A difference detector is responsive to both the true and complemented value of the difference and borrow elements to provide absolute value indications of relative position. Certain of the above operations are rendered effective only when coded indicia are directly opposite a reading unit carried by the article conveyor.

Further objects and features will become apparent from the following specification and from the drawings, in which.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

GENERAL OPERATION

Figure 1:
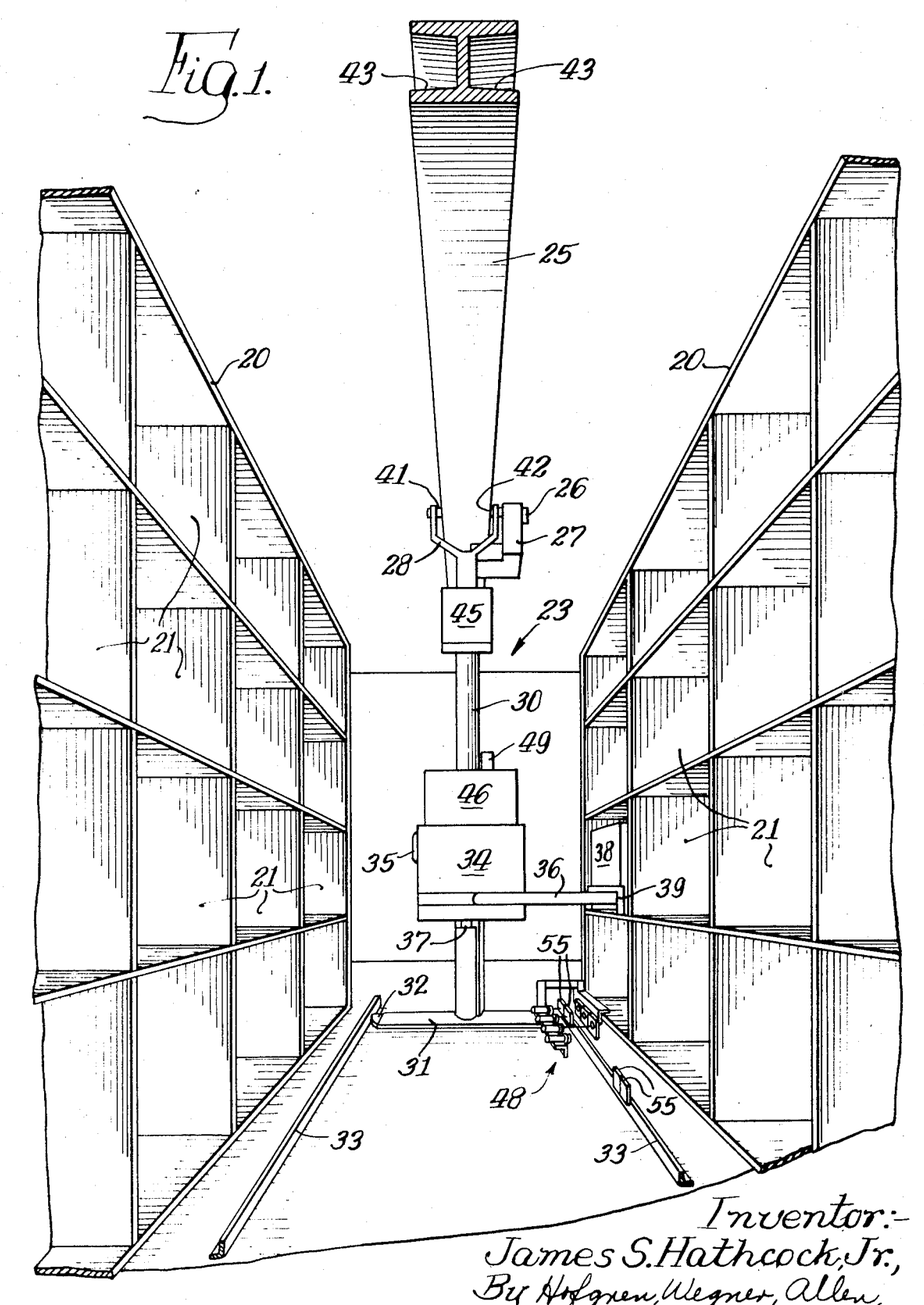
FIG. 1 is a perspective view of a warehouse including an aisle with spaced apart storage racks and incorporating a stacker crane utilizing the novel features of the applicant's invention.

FIG. 1 illustrates an automatic warehousing system embodying the invention. A number of storage racks 20, each having a plurality of bins 21 or other load-supporting means for holding articles therein, are arranged in parallel rows in a warehouse. A basic form of article conveyor or article handling device as a stacker crane 23, travels in an aisle or other travel zone between two parallel rows of storage racks 20. The stacker crane 23 is guided in a horizontal direction between the rows by means of an overhead horizontal guide and support rail 25, here a I-beam. The stacker crane 23 is propelled along the overhead support rail 25 by a motor 26 contained in a conveyor housing 27 attached to a Y-shaped carriage 28 which is suspended from the rail 25. The motor 26 is bidirectional and has both fast and slow operation in either a forward or reverse direction. The motor 26 can be abruptly stopped by conventional electric braking, which may be supplemented by a mechanical disc brake housed in the unit 27.

A vertical guide means in the form of a column 30 extends from the carriage 28 to a transverse leg member 31 located adjacent the floor of the warehouse. The ends of the leg 31 have rollers 32 which abut rails 33 attached to the floor of the warehouse. The rollers 32 help to guide the stacker crane 23 as it moves horizontally along the rows of storage racks 20. A vertical carriage 34 containing a drive motor 35 is movably attached to the vertical column 30. As an example, the motor 35 drives pinions engaging racks on the column for moving the carriage along the column. Motor 35 is similar to motor 26, having fast and slow speed operation in either a forward or reverse direction. The motor 35 is abruptly stopped by electric braking supplemented with a disc brake housed in carriage 34. An article holding or load handling means in the form of a conventional fork lift 36 is mounted on the carriage 34 and can be propelled into and out of the individual bins 21 located on either side of the aisle by an electric motor 37.

The various loads or articles 38 to be stored in the bins 21 are placed on conventional skids 39. When removing an article 38 from its bin, the fork 36 is inserted under the skid 39 by the motor 37. The fork 36 is then raised a slight amount by an upward motion of the carriage 34, and the article 38 is withdrawn from the bin 21 by the retraction of fork 36, as is well known in the art. Similarly, when depositing an article 38 in a bin, the fork 36 is inserted into the bin in a high position. The fork 36 is then lowered a slight amount by a downward motion of the carriage 34, and thereafter retracted, leaving the article in the bin 21.

The stacker crane 23 is designed to handle articles 38 located in bins 21 on either side of the aisle. The fork 36 travels in a slot in carriage 34 that allows the fork 36 to extend from the crane 23 in either a right or left direction as viewed in FIG. 1. Therefore, a single stacker crane can service two storage racks 20 located on opposite sides of the path of horizontal travel of the crane 23.

The stacker crane 23 is suspended from the horizontal guide rail 25 by means of rollers 41 and 42 that are rotatably mounted on the carriage 28. The rollers 41 and 42 roll over the inner surface 43 of the bottommost flange of the I-beam rail 25. Roller 42 is driven by the motor 26 contained in the conveyor unit 27, and causes horizontal motion of the stacker crane 23.

Power for the motors 26, 35 and 37 can be supplied through conventional parallel bus bars or other techniques (not illustrated). These bus bars can, for example, be located above or attached to the horizontal rail 25, with the unit 27 having a pair of wiper contacts which press against the bus bars to obtain the power for the stacker crane 23.

The stacker crane described is conventional and the detailed construction thereof forms no part of the applicant's invention. Any article conveyor having article holding means that can be positioned to a horizontal and vertical location in space can be used with the applicant's novel matching identification system and control apparatus. For example, the crane may be guided by a pair of rails attached to the top of the storage racks. In such a system the crane would have a T-shape, the topmost ends of the T-resting on the pair of rails. In other possible systems, only a floor mounted rail or track could be used to guide the stacker crane. For a more complete description of a stacker crane that can be used with the applicant's invention, reference is made herein to U.S. Pat. No. 3,232,455 of Fountain and Thompson entitled "Automatically Operated Crane Mechanism," issued Feb. 1, 1966, and assigned to the assignee of this application.

The stacker crane 23 is controlled by means of novel and improved control apparatus used jointly with a bin identification system which uniquely identifies the location of individual bins 21. External control information is fed into an information input unit 45 attached to the vertical column 30. The logic control unit 46 for positioning the article holding fork 36 at a predetermined bin is housed on the vertical carriage 34.

BIN IDENTIFICATION SYSTEM

Each bin 21 is provided with a unique address for locating only that particular bin in the rack 20. Each address is formed from a combination of indicia, which in the preferred form of the invention form a binary code. While a pure binary code is perhaps the simplest, many input devices use a binary coded decimal (BCD) code, and, accordingly, the control system described herein will be disclosed for a BCD code, which is preferred in order to be compatible with existing input devices.

Each bin could have attached thereto indicia or structure representing a unique BCD number. However, it is desirable for the fork 36 of the stacker crane 23 to be able to move simultaneously in both a vertical and a horizontal direction while travelling to a preselected bin. Therefore, in the preferred embodiment of this invention, each bin is indirectly located by identifying its vertical and horizontal position in the rack 20. In the case of horizontal travel, indicia representing the binary codes may be attached to the overhead rail 25, to the floor mounted rails 33, or to any other member which is fixedly positioned relative to the bins 21. Indicia representing the vertical binary codes may be attached directly to the vertical column 30.

The location of the fork 36 is determined by means of a horizontal sensing unit 48 and a vertical sensing unit 49 which read the binary codes for identifying the bins 21. Since the sensing units 48 and 49 are not attached to the fork 36, but rather to members that always move in a straight path regardless of the position of fork 36, the address system is essentially independent of the bins 21, and consequently it is possible to have simultaneous horizontal and vertical coordinate positioning of the fork 36 to a location in space that corresponds to the location of the predetermined bin. The operation of the sensing units in connection with the bin identification system will now be described.

Figure 2:
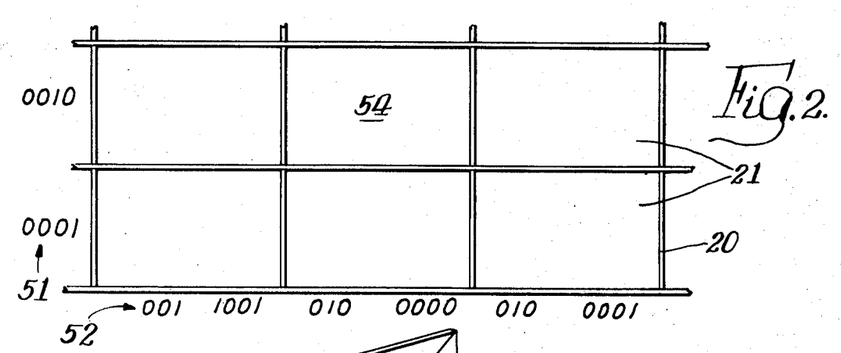
FIG. 2 is a diagrammatic representation of a plurality of storage bins whose locations are identified by means of unique indicia in the form of binary coded decimal numbers.

In FIG. 2, a plurality of storage bins 21 in storage rack 20 are diagrammatically illustrated. Each bin is located in a two-dimensional coordinate system by means of a pair of binary numbers which uniquely identify its vertical and horizontal position in space. The binary numbers located along a path 51 indicate the vertically disposed row at which the bin is located. Since the number of of vertical rows is often substantially less than the number of bins spaced along the horizontal direction, and therefore vertical control is less critical, the binary numbers along path 51 may be either pure binary or BCD, or may be single abutments for use in a control system similar to conventional counting type control systems.

The binary numbers located along a path 52 indicate the column of the storage bin. Preferably, the numbers along path 52 are in BCD form. A specific storage bin 54, for example, is identified in the storage rack 20 of FIG. 2 by means of the horizontal BCD number 010 0000, representing column 20 (and by the vertical, pure binary number 0010, representing row 2). In the present control system, binary numbers for the horizontal positions are thus composed of a set of three bits representing the tens decimal position, and a set of four bits representing the units decimal position. This BCD code allows up to 79 bins to be identified. Of course, if more bins are provided in the warehouse, the number of bits may be correspondingly increased, in accordance with the known BCD code.

Since each bit of a binary number is composed of only two basic digits, namely zero or one, such basic digits can be represented by means of any type of device having an "on" or "off" characteristic that can be detected. For example, the presence or absence of a digit could be indicated by projecting pins, or magnetic fields. In the preferred embodiment of this invention, each horizontal digit is indicated by the presence or absence of an opaque plate 55 which blocks or passes, respectively, a photoelectric light beam, see FIG. 3. Arbitrarily, the presence of a plate 55 may be chosen to represent a binary 1 digit and the absence of the plate will thus represent a binary 0 digit. The groups or sets of plates 55 are attached to rail 33 to identify the horizontal position of the bin.

For simplification, the present disclosure will explain the horizontal positioning system in detail, it being understood that the same system may be used for vertical positioning. While the horizontal plates 55 are illustrated as attached to the rail 33 mounted to the floor of the warehouse, it will be understood that the rail may be located at any position. For example, when using the article conveyor disclosed in the before identified patent, the plates 55 may be located on rails attached to the top of the storage racks, which guide the topmost ends of a T-shaped crane.

Figures 3, 4:
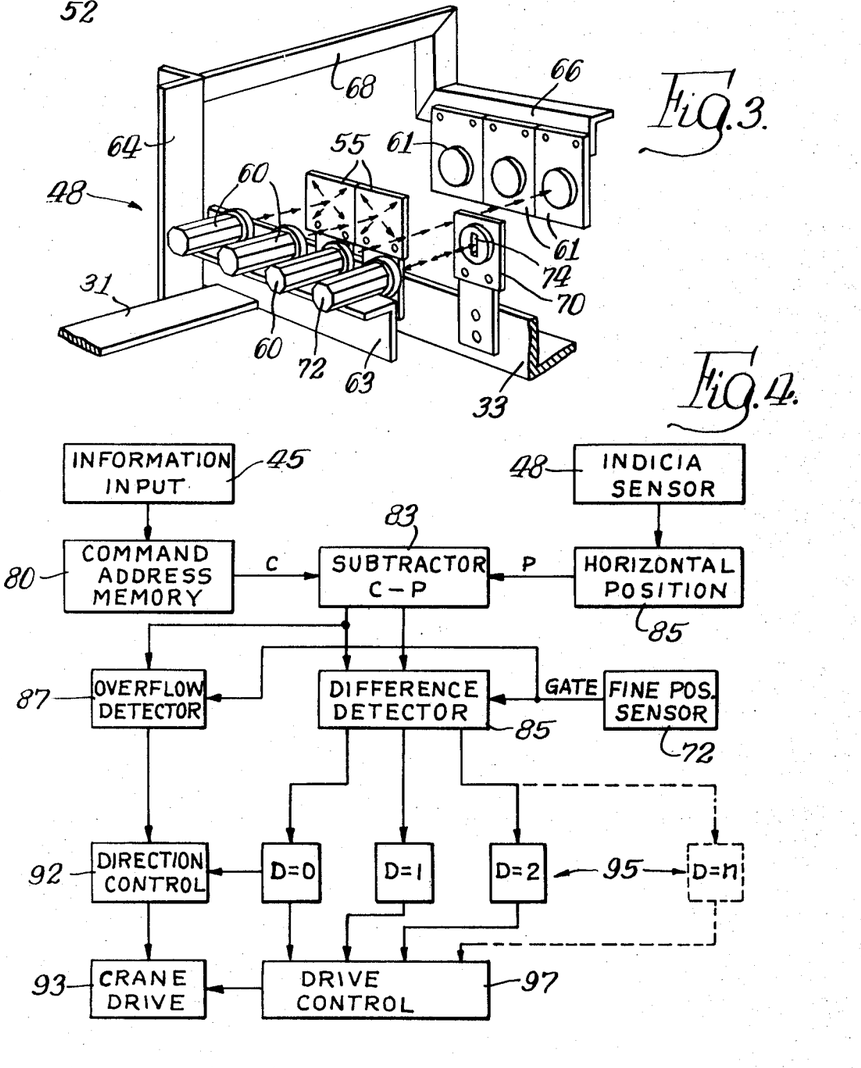
FIG. 3 is a perspective view of a horizontal guide beam with structure attached thereto defining indicia sensed by a photoelectric sensing unit carried by the stacker crane.
FIG. 4 is a block diagram of the command apparatus for controlling the operation of the stacker crane shown in FIG. 1.

Horizontal sensing unit 48 is illustrated in detail in FIG. 3. For each bit of the BCD code, a light source 60 generates a photoelectric beam which passes through space and impinges a corresponding photoelectric cell 61. For clarity, the photoelectric sensors for only three bits are illustrated in FIG. 3. All of the light sources 60 are mounted on an L-beam 63 which is rigidly attached to an upstanding L-beam 64 connected to leg 31 of the stacker crane. Similarly, all of the photoelectric cells 61 are mounted to an L-beam 66 which is connected by means of an elbow rail 68 to L-beam 64. As the stacker crane moves along rail 33, light sources 60 and corresponding photoelectric cells 61 are similarly moved along rail 33 and past groups of plates 55 which indicate the BCD address of the horizontal bin position represented thereby.

When sensing unit 48 is properly positioned, the plates 55 mounted to rail 33 block the photoelectric beams for each bit having a 1 digit, thereby terminating the output signals normally generated by photoelectric cells 61. In the figure, plates 55 block the left-hand and centermost photobeams, but allow the right-hand photobeam to pass to its photoelectric cell 61 and produce an output.

To indicate when unit 48 is positioned so that the parallel outputs of cells 61 carry valid information, i.e., indicate that each photobeam is impinging a plate or passing through the space corresponding to the BCD bit represented thereby, plate 70 is riveted to rail 33. To detect plate 70, rail 63 carries a fine position sensor 72. Sensor 72 mounts both a light source and a photoelectric cell. The plate 70 includes a reflector strip 74 which reflects the photobeam from the light source in sensor 72 back to the photoelectric cell therein, when sensing unit 48 is properly horizontally aligned to read the BCD address represented by plates 55 and associated spaces. Strip 74 may be formed by covering a reflector with an opaque mask having a narrow aperture slit corresponding to strip 74. While the photoelectric cells 61 have been illustrated as mounted on beam 66, the cells 61 could be mounted adjacent their light source 60, similar to sensor 72, and positioned to respond to a photobeam reflected off reflectors located on beam 66.

The location of the BCD address plates 55 along the rail 33 is not critical as long as their position can be related to the corresponding horizontal position of the bin they represent. In the preferred form of the invention, the BCD numbers are positioned so that the stacker crane, when reading a BCD address, has its fork 36 located at the middle or column center (CC) position of each bin. Thus, the output signal from sensor 72, indicating sensing of the plate 70, is used to both effectively gate information from all the photoelectric cells 61 to the control circuit, and to provide a fine positioning indication, eliminating the necessity for separate abutments or the like in order to provide fine positioning information.

The control apparatus that positions the stacker crane at any desired location by using the BCD number system will now be described in detail.

CONTROL APPARATUS

The control apparatus for automatically controlling the operation of the stacker crane 23 is illustrated in block diagram form in FIG. 4. Only the control apparatus for horizontal movement is illustrated in detail. As previously described, vertical control apparatus may, if desired, be similar to the horizontal control apparatus, or could be patterned after known prior control apparatus.

External control or command information may originate from any desired source, as a computer or a manual input, which provides or is modified to provide BCD coded information. By any suitable means, this information is transmitted to information input unit 45, which couples it to a command address memory unit 80. The memory may include storage for other command information which is to control the stacker crane. The stored address or command C, which identifies a preselected bin, is coupled to one of a pair of inputs of a subtractor unit 83. The other input to the subtractor unit 83 is a horizontal position address P, from a horizontal position unit 85 coupled to the indicia sensor 48. Unit 85 includes circuitry which energizes bit position representing relays in response to the signals from sensor 48.

Subtractor unit 83, which always subtracts the command address C from the actual position address P, may take any of several forms. It may be analog or digital, decimal or binary, or serial or parallel. The C and P inputs may be coded in many different ways, although preferably they use the same coding scheme to avoid the necessity of making a code conversion.

For purposes of comparing the actual position with the desired or commanded address, subtractor unit 83 has outputs which are coupled to a difference detector 85 and an overflow detector 87. Direction of travel information is determined by overflow detector 87 which senses whether subtractor unit 83 has an overflow borrow condition. That is, if the subtracted difference (C-P) is positive, the borrow computations do not "overflow," as will appear. This indicates that the selected address is in advance of the present position, and therefore the stacker crane should move in a direction to decrease the difference, which may be arbitrarily designated forward. Conversely, if the subtracted difference (C-P) is a negative number, as indicated by an "overflow" borrow condition, the stacker crane should move in the opposite direction, arbitrarily designated reverse.

The overflow detector unit 87 is gated or rendered effective each time the fine position sensor 72 detects the column center plate 70, FIG. 3. The detection of plate 70 gates the signal from overflow detector 87 to a direction control 92. The direction control, which itself may be of known construction, controls a conventional crane drive 93 which includes motor 26, FIG. 1.

To control the speed of travel of the stacker crane, including slowdown and stopping at a selected bin, the difference detector 85 determines the absolute value of the difference number (C-P) from subtractor unit 83. When one of a plurality of preselected absolute value differences D is recognized, a corresponding output 95 is generated. Any number of outputs 95 may be provided, through D=$n$, where $n$ represents an absolute value difference which is to cause some type of control operation. In the present system, outputs 95 are provided when the stacker crane is located two, one, and zero bins away in either direction from the selected bin, namely when D=2, D=1, and D=0, respectively.

All of the outputs 95 are coupled to a conventional drive control unit 97, which controls the motors and brakes within crane drive 93, to thereby control speed and stopping of the stacker crane. When D=0, the stacker crane is located at column center of the preselected bin. The D=0 output 95, coupled to drive control 97, is used to set the mechanical brake in crane drive 93.

In order to decelerate prior to final stopping as controlled by D=0, the other blocks 95 are used to slow the stacker crane as it approaches its preselected bin. In the present embodiment, when the stacker crane is located two bins away, the D=2 output 95 is used to bias an eddy current brake in drive control 97. Upon the occurrence of the D=1 output 95, the eddy current brake is actuated in order to decelerate the crane from its fast to its slow speed of traverse. As previously explained, when D=0, the mechanical brake is set and the crane is abruptly stopped.

Fine position sensor 72 serves as a gate for the difference detector 85, in order to indicate when the outputs from subtractor unit 83 represent a valid different signal, namely, when the input P to subtractor unit 83 represents a complete address. Of course, the gating controlled by sensor 72 could occur elsewhere than illustrated.

For certain speed and brake controls, it is desirable to maintain actuation of the control, once actuated, until the crane is finally stopped. This is accomplished by maintaining outputs 95 energized after they are first energized, until D=0. The detailed control to be described later used this modified embodiment. Thus, outputs 95 actually are provided for D=0, D $\leq$ 1, and D $\leq$ 2, in place of D=0, D=1, and D=2, respectively.

Desirably, no forward or reverse direction indication should be maintained when (C-P) is zero, namely, when the stacker crane is finally positioned directly in front of a selected bin. Accordingly, the D=0 output 95 is coupled to direction control 92 to deenergize or reset all direction indicating relays in direction control unit 92 when an output is generated by the D=0 block, thus placing the control system in a rest or cleared state in preparation for the next operation inputted at unit 45.

A detailed description of the subtractor 83, difference detector 85 and outputs 95, and overflow detector 87 will now be presented.

DETAILED CONTROL CIRCUIT

In the remaining figures, a relay implementation of the control system is illustrated. As is conventional, all relay contacts are identified by the same letter symbol which identifies the relay coil, followed by a dash and a number for distinguishing that relay contact from all the other relay contacts controlled by the same relay coil. All relay contacts are shown for the deenergized state of the corresponding relay coil.

Figure 5:
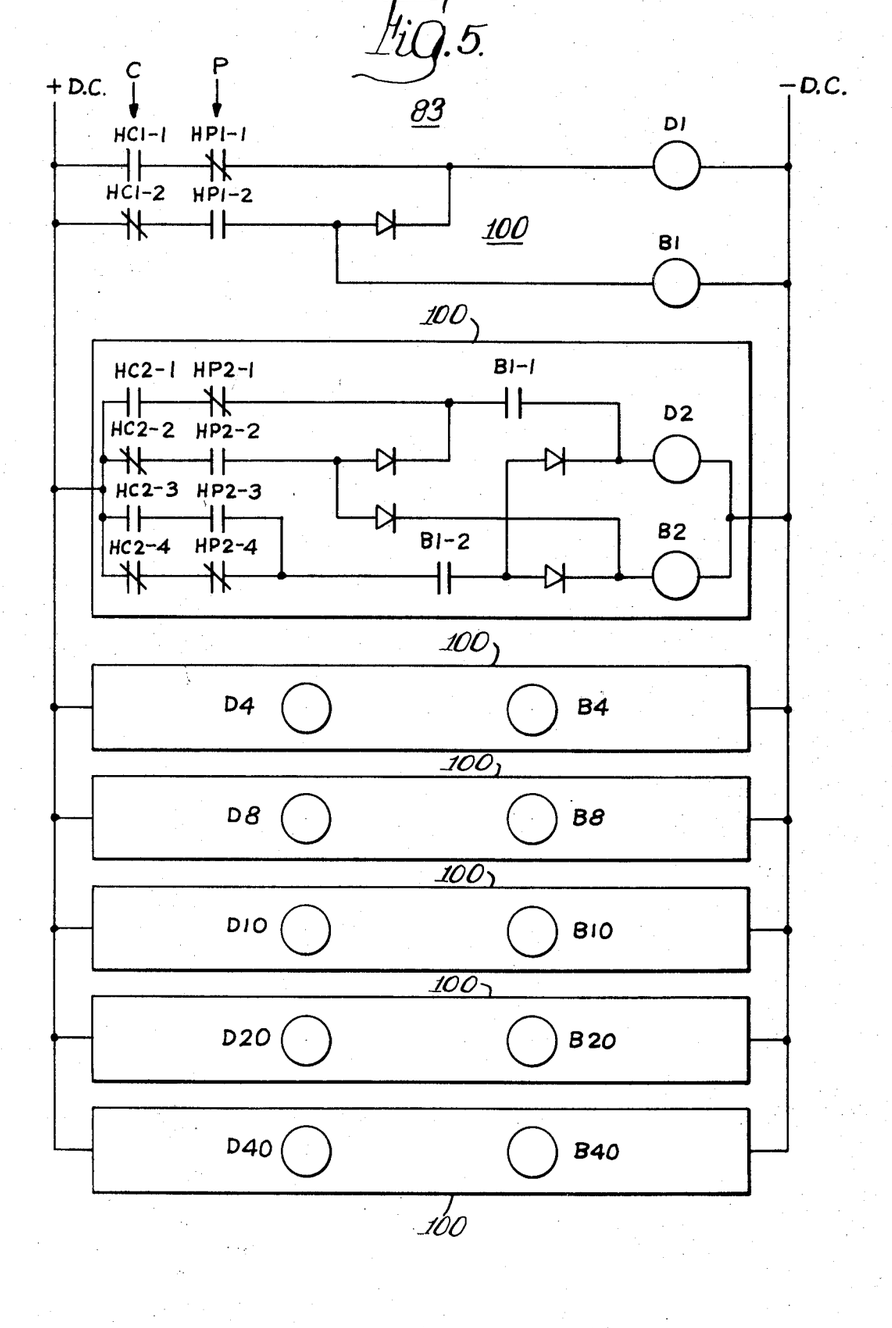
FIG. 5 is a partly schematic and partly block diagram illustrating the subtractor unit shown in FIG. 4.

In FIG. 5, a detailed partly schematic and partly block diagram for subtractor unit 83 is illustrated. A parallel binary subtractor design is utilized, in which the BCD position P is subtracted from the BCD command C. Since the circuit is shown for only horizontal positioning, all inputs are represented either by the symbol HP for horizontal position, or the symbol HC for horizontal command.

For each bit in the BCD address code, a corresponding stage 100 is provided. Thus, four separate stages 100 are provided for the set of four bits representing the units decimal position, i.e., bits 1, 2, 4, and 8, and three separate stages 100 are provided for the set of three bits representing the tens decimal positions, i.e., bits 10, 20 and 40. Each stage 100 includes relay coils, indicated by circles, which are energized when certain conditions are satisfied. A difference relay D in each stage 100 indicates whether the subtraction of the HP bit from the corresponding HC bit is one. When the subtraction yields one, the relay coil D is energized. If the subtraction process within any stage 100 requires that a bit be borrowed, a borrow relay B will be energized in that stage 100.

The subtractor 83 may be any unit which solves the known Boolean equation for subtraction, namely:

$$D_n = (C_n \cdot \overline{P_n} + \overline{C_n} P_n) \overline{B_{n-1}} + (C_n P_n + \overline{C_n P_n}) B_{n-1} \quad (1)$$

$$B_n = (C_n P_n + \overline{C_n} \overline{P_n}) B_{n-1} + \overline{C_n} P_n \quad (2)$$

To illustrate the implementation of these equations, the stages 100 for the first and second least significant binary bits are illustrated in detail, namely for $n=1$ and $n=2$. For the first or least significant bit $n=1$, there is no borrow from a preceding bit, since $B_{n-1} = B_0$, and hence:

$$D_1 = C_1 \overline{P_1} + \overline{C_1} P_1 \quad (3)$$

$$B_1 = \overline{C_1} P_1 \quad (4)$$

It will be seen that relay D1 in the upper stage 100 is energized in accordance with equation (3) above, and that the borrow relay B1 in the same stage is energized in accordance with the equation (4) above. Because FIG. 5 implements only horizontal positioning, the designations $C_n$ and $P_n$ in the equations are represented in FIG. 5 by the relay contacts HCn and HPn, respectively. Relay coils HC are located in the command address memory 80 of FIG. 4, and the relay coils HP are located in the horizontal position unit 85 of FIG. 4. When the bits of the BCD number are present, i.e., a 1, the corresponding relay coils HC and HP are energized to cause the corresponding relay contacts in FIG. 5 to change states. Thus, if the least significant bit of P is a 1, relay coil HP1 is energized, changing the state of all relay contacts of HP1.

For the second least significant bit $n=2$, the above equations (1) and (2) may be calculated as above described for the first bit position. The implementation of such calculation is shown in stage 100 for relays D2 and B2. The detailed implementations of the remaining bits are not illustrated in detail, it being understood that the circuits in stages 100 for the remaining bits $n=4, 8, 10, 20$ and 40 are identical with the circuit in stage 100 for $n=2$, with the appropriate relay contacts HCn and HPn, replacing relay contacts HC2 and HP2.

For seven bit position stages 100, a total of 79 different horizontal bin locations may be handled. Additional horizontal bin locations may be provided for by further stages 100 which implement the Boolean equations (1) and (2) above. The energization of any relay D or relay B causes the corresponding contacts thereof to change state. As can be seen from the drawings, these contacts are both used in succeeding stages 100, and in the circuit of FIG. 6, which shows the units connected to the subtractor unit 83.

Figure 6:
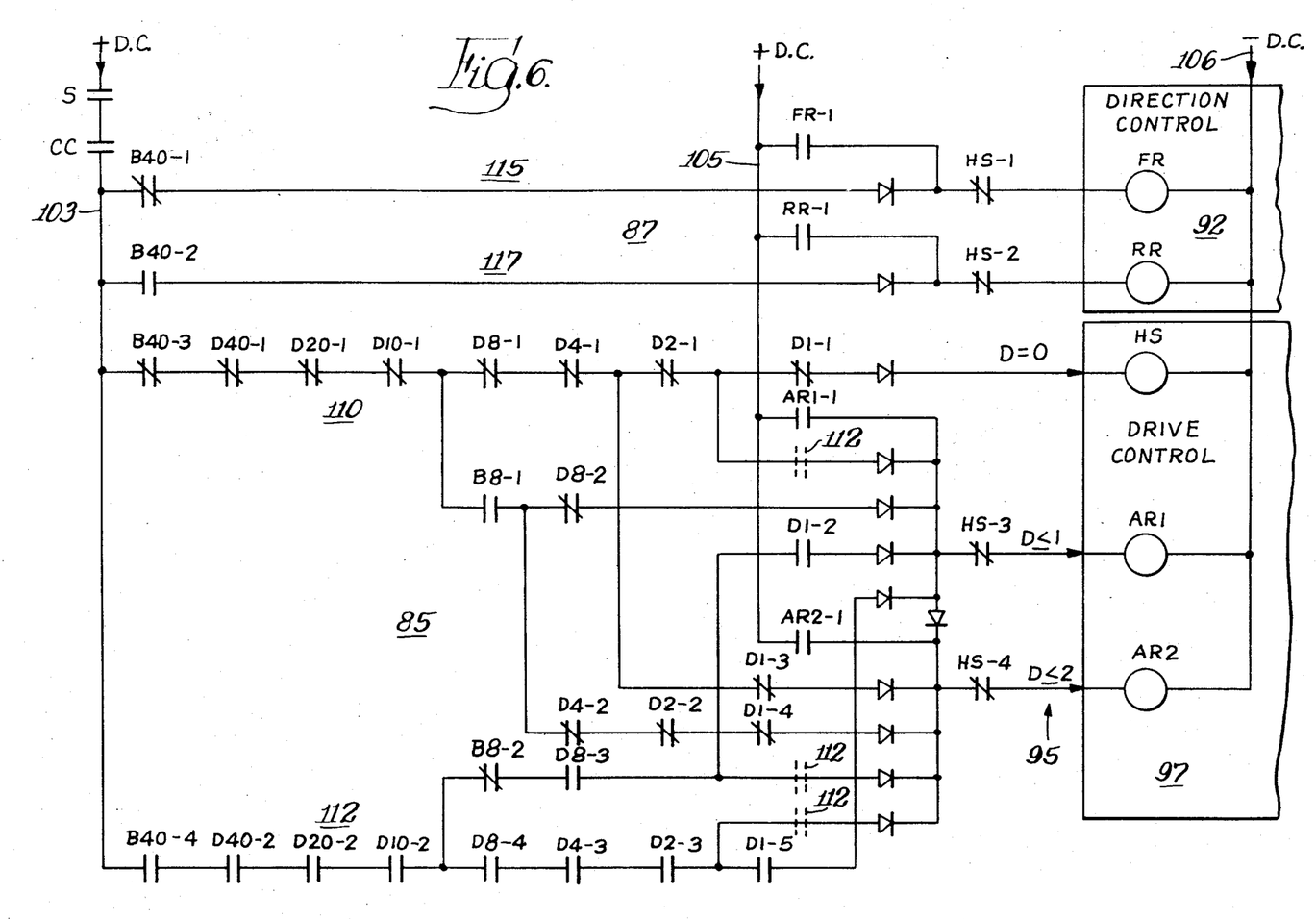
FIG. 6 is an across-the-line diagram illustrating the units connected to the subtractor unit shown in FIG. 4.
Figure 7:
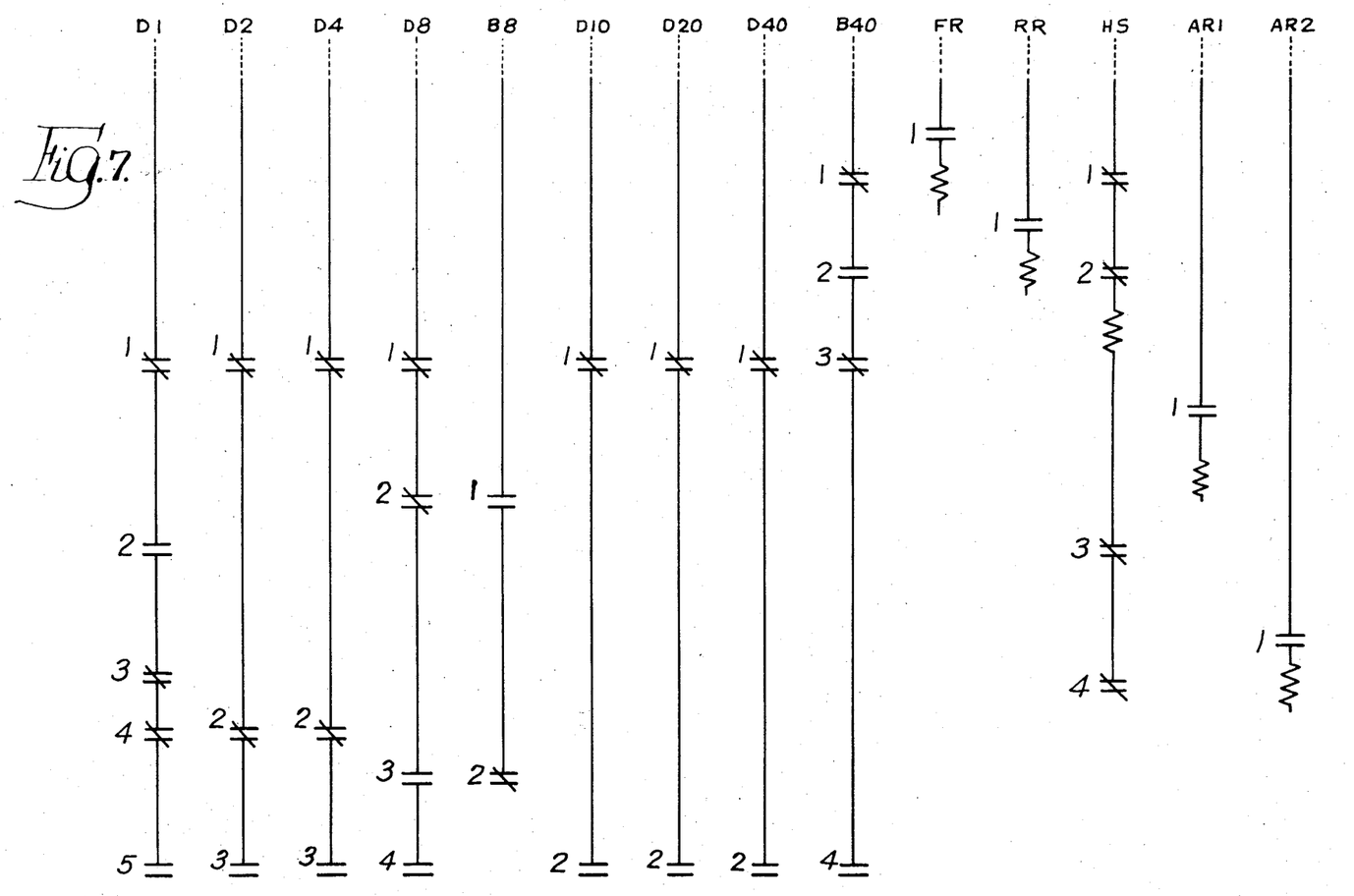
FIG. 7 is a key diagram for the relay coils and contacts shown in the across-the-line diagram of FIG. 6.

Turning to FIG. 6, the circuits for overflow detector 87, and difference detector 85 and its outputs 95 are illustrated in detail. These circuits control the direction control unit 92 and the drive control unit 97, which may be conventional in nature, and only a portion of which are illustrated in FIG. 6.

The circuit of FIG. 6 is operative only when the fine position sensor 72 of FIG. 4 indicates that indicia sensor 48 is in an aligned reading position, and when other controls for the automatic warehousing apparatus indicates that the system should be operative. These conditions are represented by a relay contact S from a conventional sequence control (not illustrated) for the system. If all conditions are proper and the system is in cycle, a conventional relay coil in the sequence control will be energized, to close contact S and connect positive DC voltage to a relay contact CC.

The normally open relay contact CC is a contact controlled by fine position sensor 72. When the stacker crane is located so that sensor 72 is directly opposite slit 74, see FIG. 3, a signal is provided which energizes a relay (not illustrated) to close contact CC, which serves as a gate for both the difference detector 85 and the overflow detector 87. Thus, when the gating signals are present, positive DC potential is connected to a line 103. The same positive DC potential is at all times connected to a line 105, and negative DC potential is connected to a line 106, for purposes of energizing relays in direction control 92 and drive control 97.

Difference detector 85 consists of a branch 110 operative when C is equal to or greater than P (C ≥ P), and a branch 112 operative when C is less than P (C<P). The difference detector operates essentially on straight binary, but includes interconnections between branches 110 and 112 to compensate for the fact that the actual output from the subtractor represents a BCD subtraction process. By use of difference detector 85, the BCD subtraction is directly converted into absolute difference values D at output lines 95.

When the detector 85 determines that the absolute value of the difference between horizontal command and horizontal position is zero, output line 95 labeled D=0 is coupled through closed relay contacts in branch 110 to line 103, thereby coupling power across a horizontal stop relay HS. Relay HS has contacts shown in FIG. 6, and in addition has conventional contacts (not illustrated) which are used in the drive control unit 97 for conventional stopping purposes. When relay HS is energized, a mechanical disk brake housed in unit 27 of FIG. 1 is activated, thereby abruptly stopping horizontal movement of the stacker crane.

When the output line 95 labeled D ≤ 1 is energized, power from line 103 is connected via closed relay contacts in branch 110 to an acceleration relay AR-1. This relay has contacts shown in FIG. 6, and in addition has contacts (not illustrated) located in drive control 97 for energizing a magnetic eddy current electric brake located within the unit 27 of FIG. 1. The energization of this brake slows the motor from its fast to its slow speed of traverse.

When the absolute difference between the horizontal command and position is two, the output line 95 labeled D ≤ 2 is coupled to line 103 via closed relay contacts in branch 112, thereby energizing an acceleration relay AR-2. Relay AR-2 in drive control 97 is connected to control operations which must occur before a slowdown initiated by relay AR-1 will occur. In the case of a conventional magnetic eddy current brake, bias must be applied before the brake is actually energized. Relay AR-2 is connected to supply bias to the eddy current brake, so that upon energization of relay AR-1, the stacker crane will be slowed from its fast to its slow speed of traverse. Alternatively, if several stages of slowdown are desired, relay AR-2 may be used to initiate a slowdown prior to the final slowdown initiated by relay AR-1.

Relays AR-1 and AR-2 desirably remain energized as long as the absolute difference is equal to or less than the value that initially energized the relay. While the circuit has been illustrated for such a circumstance, it will be understood that the circuit could be designed to energize the relays only when the absolute difference is equal to the value which initially energizes the relay, and to deenergize the relay for all other absolute difference values.

The theory of operation of the detector 85 will now be explained. If a series of logic tables are formed of the difference and borrow results of pure binary subtraction of position P (in BCD) from command C (in BCD) for all combinations of numbers equal to, one away, and two away from the other, a list is obtained of all difference bit positions $D_n$ and all borrow bit positions $B_n$ which are 1 when the absolute difference between the numbers is zero, one, and two. When C is smaller than P, the difference bits $D_n$ will represent a complement of the difference number, and the borrow bit $B_n$ will indicate that the command C is less than P. For example, if $C = 24$ and $P = 26$, then $(C-P)$ is:

```
C   0 1 0    0 1 0 0
P   0 1 0    0 1 1 0
D   1 1 1    1 1 1 0
B   1 1 1    1 1 1 0
```

In this example, $D_1 = 0$, $D_2 = 1$, $D_4 = 1$, $D_8 = 1$, $D_{10} = 1$, $D_{20} = 1$ and $D_{40} = 1$; and $B_1 = 0$, $B_2 = 1$, $B_4 = 1$, $B_8 = 1$, $B_{10} = 1$, $B_{20} = 1$ and $B_{40} = 1$, when in fact the absolute value of $(C-P) = |2|$.

Thus, the presence of certain borrow bits $B_n$ when $D_n$ represents a large number, in fact represents an absolute difference of two. Similarly, the presence of certain borrow bits $B_n$ when $D_n$ represents a large number indicates that the absolute value is one. A study of such tables will result in the following Boolean equations, which indicate when the subtractions in fact produce the absolute value differences of zero, one, and two:

$$|C-P| = |0| = \overline{D_{40}} \, \overline{D_{20}} \, \overline{D_{10}} \, \overline{D_8} \, \overline{D_4} \, \overline{D_2} \, \overline{D_1} \quad (5)$$

$$|C-P| = |1| = \overline{B_{40}} \, \overline{D_{40}} \, \overline{D_{20}} \, \overline{D_{10}} \, \overline{D_8} \, (B_8 + \overline{D_4} \, \overline{D_2} \, D_1) \quad (6)$$

$$+ B_{40} \, D_{40} \, D_{20} \, D_{10} \, D_8 \, (\overline{B_8} D_1 + D_4 \, D_2 \, D_1)$$

$$|C-P| = |2| = \overline{B_{40}} \, \overline{D_{40}} \, \overline{D_{20}} \, \overline{D_{10}} \, \overline{D_8} \, (B_8 \, D_4 \, D_2 \, D_1 + \overline{D_4} \, D_2 \overline{D_1}) \quad (7)$$

$$+ B_{40} \, D_{40} \, D_{20} \, D_{10} \, D_8 \, (\overline{B_8} \, D_8 \, \overline{D_1} + D_4 \, D_2 \, \overline{D_1})$$

The above equations make use of the fact that certain combinations of bits, such as $C_8 \, C_4 \, \overline{C_2} \, \overline{C_1}$ do not occur. The circuit of FIG. 6 implements these equations, so that relays HS, AR1 and AR2 are energized when equations (5), (6) and (7), respectively, have a logical 1 sum. Of course, the presence of $D_{40}$, for example, in these equations is implemented by placing an appropriate relay contact of relay D40 in the path for energizing the output line 95 corresponding to the equation being solved For the illustrated circuit, as previously described, the relay AR-2 is to be energized not only when the absolute valve of D is two, but also when the absolute value is one and zero. Similarly, relay AR-1 is to be energized when $D=1$, and when $D=0$. The detector 85 of FIG. 6 implements the above equations (5), (6) and (7) and the special conditions above by eliminating contacts 112 illustrated by the dashed lines in FIG. 6, and by adding the contacts AR1-1 and AR2-2 which form holding contacts for relays AR1 and AR2, respectively. Thus, relays AR1 and AR2 remain energized until $D=0$ is detected, at which time energization of relay HS opens contacts HS-3 and HS-4, thereby breaking the holding circuit.

The overflow detector 87 is used to determine whether the stacker crane should move in a forward or a reverse direction. If movement is to be in the forward direction, a forward relay FR in direction control 92 is energized. Conversely, if the stacker crane is to move in the reverse direction, a reverse relay RR is energized. The contacts FR and RR used in direction control 92 are connected in a conventional manner, in order to control the direction of movement of the stacker crane. When the stacker crane is to stop, as represented by the energization of relay HS, contacts HS-1 and HS-2 in detector 87 open, thereby deenergizing relays FR and RR. Thus, neither direction control relay is energized when the crane is at a desired bin position.

Detector 87 includes a branch 115 which is energized when C is greater than or equal to P ($C \geq P$), and a branch 117 which is energized when C is less than P ($C < P$). Branch 115 indicates that $C \geq P$ when borrow relay B-40 is not energized, thus allowing contact B40-1 to remain closed. This indicates that the subtractor was able to subtract P from C, without borrowing from the last most significant bit. Conversely, if a borrow was necessary, relay B-40 is energized, opening contact B40-1 and closing contact B40-2, thereby completing branch 117 and energizing relay RR. Thus, the "overflow" of a borrow, as indicated by the necessity of borrowing from the last most significant bit in order to accomplish subtraction, indicates that reverse direction of travel is necessary.

When either relay FR or RR is energized, it completes its own holding path, in order to remain energized until a stop condition occurs. Namely, contact FR-1 closes to maintain relay FR energized, or contact RR-1 closes to maintain energized relay RR. When the stacker crane is positioned at the column center position of the desired bin, $D=0$ and relay HS is energized, as previously described, thereby opening contacts HS-1 and HS-2 in order to deenergize the direction control relay FR or RR which had previously been energized.

While the detailed circuits in FIGS. 5 and 6 have been implemented by relay logic, it will be understood that solid state control may be substituted therefore, or that other types of controls may be used, all of which solve the Boolean equations previously described. Other equivalent modifications will be apparent to those skilled in the art.

I claim:

1. A warehousing system comprising:
   a plurality of load storing means;

an article conveyor, load handling means mounted on said conveyor to remove or deposit a load from a selected one of said load storing means;

drive means for moving said article conveyor in a travel zone adjacent said load storing means;

a plurality of location means disposed in relation to said load storing means and each embodying a BCD system having an arrangement of groups of binary digits in BCD form with each group representing a different decimal power of ten for identifying a location along said travel zone effectively related to a load storing means;

sensing means mounted on said article conveyor for reading the BCD binary digits embodied in each location means;

control means for said drive means including address means for receiving an arrangement of binary digits in BCD or pure binary form and representing a number identifying a selected load storing means, pure binary subtractor means having a first input coupled to said sensing means and a second input coupled to said address means for effecting between the pair of BCD binary digits at said inputs subtraction in a pure binary system having an arrangement of binary digits in continuous sequence representing successive powers of two, said subtractor means includes a plurality of difference means for generating at least difference bits $D_1, D_2, D_4, D_8, D_{10}, D_{20}, D_{40}$ and a plurality of borrow means for generating at least borrow bits $B_1, B_2, B_4, B_8, B_{10}, B_{20}, B_{40}$ resulting from pure binary subtraction of the pair of BCD binary digits at said inputs; and detector means responsive to the pure binary subtraction of said subtractor means for modifying the speed of said article conveyor whenever said article conveyor is a preselected number away from said selected load storing means, said detector means determining when said article conveyor is a preselected different X away from said selected load storing means by solving the Boolean equation $$X = \overline{B_{40}}\ \overline{D_{40}}\ \overline{D_{20}}\ \overline{D_{10}}\ \overline{D_8}\ (B_8 + \overline{D_4}\ \overline{D_2}\ D_1)$$
$$+ B_{40}\ D_{40}\ D_{20}\ D_{10}\ D_8\ (\overline{B_8}\ D_1 + D_4\ D_2\ D_1)$$

or by solving the Boolean equation $$X = \overline{B_{40}}\ \overline{D_{40}}\ \overline{D_{20}}\ \overline{D_{10}}\ \overline{D_8}\ (B_8\ D_4\ D_2\ D_1 + \overline{D_4}\ D_2\ \overline{D_1})$$
$$+ B_{40}\ D_{40}\ D_{20}\ D_{10}\ D_8\ (\overline{B_8}\ D_8\ \overline{D_1} + D_4\ D_2\ \overline{D_1}).$$

2. The warehousing system of claim 1 wherein said drive means moves said article conveyor in forward or reverse directions in said travel zone, said detector means includes first branch means energized when the number at said first input is greater than the number at said second input and second branch means energized when the number at said first input is less than the number at said second input, and direction of travel means responsive to energization of one of said branch means for controlling said drive means to move said article conveyor in only one direction in said travel zone.

3. The warehousing system of claim 2 wherein said detector means includes third branch means responsive when all of the difference means in said subtractor means register zero numerical difference therein for resetting said direction of travel means.

4. The warehousing system of claim 1 wherein each unique group of binary digits for each of said location means includes a trigger indicia for indicating when the sensing means is disposed for correctly reading the unique group of binary digits adjacent thereto, said sensing means includes means for reading said unique group of binary digits and means for reading said trigger indicia, said control means further includes means responsive to said trigger indicia reading means for rendering effective a stopping means, whereby said location means serves as a fine positioning element.

5. The warehousing system of claim 4 wherein said sensing means comprise sensors for detecting an energy wave field, said binary digits comprise the presence or absence of binary representing elements in said energy wave field, and said trigger indicia comprises an element in said energy wave field having a narrow width substantially less than the width of each binary representing element.

* * * * *